US012802035B2

(12) United States Patent
Prasad et al.

(10) Patent No.: US 12,802,035 B2
(45) Date of Patent: Nov. 17, 2026

(54) SYSTEM AND METHODS FOR REDUCING ORDER CART PICK ERRORS

(71) Applicant: KoiReader Technologies, Inc., Dallas, TX (US)

(72) Inventors: Ashutosh Prasad, Dallas, TX (US); Vivek Prasad, Bengaluru (IN)

(73) Assignee: KoiReader Technologies, Inc., Coppell, TX (US)

( * ) Notice: Subject to any disclaimer, the term of this patent is extended or adjusted under 35 U.S.C. 154(b) by 0 days.

(21) Appl. No.: 19/100,992

(22) PCT Filed: Aug. 4, 2023

(86) PCT No.: PCT/US2023/071647
§ 371 (c)(1),
(2) Date: Feb. 4, 2025

(87) PCT Pub. No.: WO2024/031037
PCT Pub. Date: Feb. 8, 2024

(65) Prior Publication Data

US 2026/0044821 A1 Feb. 12, 2026

Related U.S. Application Data

(60) Provisional application No. 63/370,416, filed on Aug. 4, 2022.

(51) Int. Cl.
*G06Q 10/087* (2023.01)
*G06F 9/54* (2006.01)

(52) U.S. Cl.
CPC ....... *G06Q 10/08741* (2025.08); *G06F 9/542* (2013.01)

(58) Field of Classification Search
CPC .......................... G06Q 10/08741; G06F 9/542
See application file for complete search history.

(56) References Cited

U.S. PATENT DOCUMENTS 7,516,848 B1 * 4/2009 Shakes ...................... B07C 5/38 271/223
10,589,931 B2 3/2020 Jarvis et al.
10,845,235 B2 * 11/2020 McNeally .......... G01G 19/4144
10,853,764 B2 * 12/2020 Durkee .............. G06Q 30/0639
(Continued)

FOREIGN PATENT DOCUMENTS

WO WO2022081518 A2 4/2022

OTHER PUBLICATIONS

Vidovič, Ela, and Brigita Gajšek. "Analysing picking errors in vision picking systems." Logistics, Supply Chain, Sustainability and Global Challenges 11.1 (2020): 90-100. (Year: 2020).*
(Continued)

*Primary Examiner* — Nathan A Mitchell
(74) *Attorney, Agent, or Firm* — Lee & Hayes, P.C.

(57) ABSTRACT

Techniques are described for verifying pick events associated with a storage facility or yard. For example, a system may be configured to capture sensor data associated with a pick event and determine if any incorrect items are placed in an order cart during the pick event. The system may provide substantially real-time feedback in the form of alerts to an operator associated with the order cart, thereby reducing erroneous items from shipping.

20 Claims, 6 Drawing Sheets

(56) References Cited

U.S. PATENT DOCUMENTS

| | | | | |
|---|---|---|---|---|
| 2016/0063429 | A1* | 3/2016 | Varley | G06Q 10/087 700/216 |
| 2019/0154492 | A1* | 5/2019 | McNeally | G01G 19/4144 |
| 2019/0367272 | A1* | 12/2019 | Campbell | B65G 1/1375 |
| 2020/0065748 | A1* | 2/2020 | Durkee | G06Q 30/0639 |
| 2020/0265380 | A1* | 8/2020 | Dubois | G06Q 10/0835 |
| 2021/0241217 | A1* | 8/2021 | Lert, Jr | B65G 1/0492 |
| 2022/0122029 | A1* | 4/2022 | Martin, Jr. | B62B 5/0096 |
| 2022/0171972 | A1* | 6/2022 | Stankovic | G06V 10/25 |
| 2022/0177227 | A1* | 6/2022 | Khodl | B65G 1/1375 |
| 2023/0034894 | A1* | 2/2023 | Moon | G06Q 10/087 |
| 2023/0121652 | A1* | 4/2023 | Francis | G06Q 30/0639 705/26.8 |
| 2026/0051173 | A1* | 2/2026 | Gherman | G06V 20/52 |

OTHER PUBLICATIONS

Bovo, Riccardo, et al. "Detecting errors in pick and place procedures: detecting errors in multi-stage and sequence-constrained manual retrieve-assembly procedures." Proceedings of the 25th international conference on intelligent user interfaces. 2020. (Year: 2020).*

Li, Xingyan, et al. "Using Kinect for monitoring warehouse order picking operations." Proceedings of Australasian Conference on Robotics and Automation. vol. 15. 2012. (Year: 2012).*

PCT Search Report and Written Opinion mailed on Nov. 15, 2023 for PCT Application No. PCT/US23/71647 from PCT Summary, 9 pages.

Extended European Search Report for European Application No. 23850984.8, dated Jun. 25, 2026, 9 pages.

* cited by examiner

SYSTEM AND METHODS FOR REDUCING ORDER CART PICK ERRORS

CROSS-REFERENCE TO RELATED APPLICATIONS

This application is a U.S. national stage application under 35 USC § 371 of International Application No. PCT/US23/71647 filed on Aug. 4, 2023 which claims priority to U.S. Provisional Application No. 63/370,416 filed on Aug. 4, 2022, the entire contents of which are incorporated herein by reference.

BACKGROUND

Storage facilities, such as shipping yards, processing plants, warehouses, distribution centers, ports, yards, and the like, may store vast quantities of inventory over a period of time. Facility operators often generate shipments of various different inventory items. Unfortunately, shipments often contain missing items, wrong items, additional items, and the like, resulting in unnecessary costs associated with lost item claims, returns, and unnecessary restocking.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
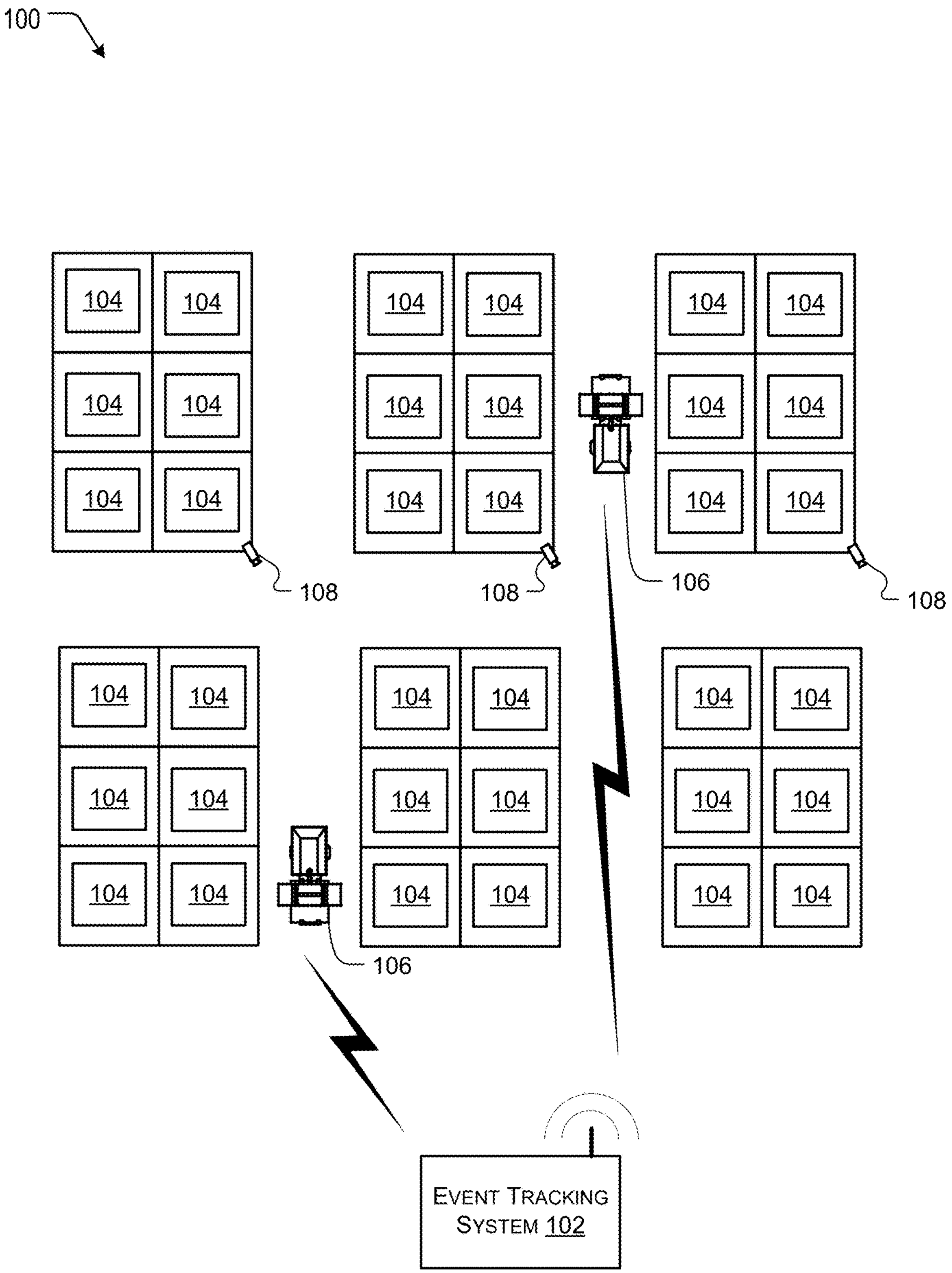
FIG. 1 is an example block diagram of an event tracking system, according to some implementations.

Discussed herein are systems and devices for automating and computerizing audits, tracking, and error prevention associated with picking events at a storage facility, yard, warehouse, or the like. In some storage facilities, facility operators may receive orders to be filled. The orders may contain various items of differing quantities that are located throughout the facility. In order to fulfill the orders, the facility operators (e.g., personnel, robotic systems, autonomous systems, and the like) may navigate a cart through the facility and select or pick the items associated with the order by placing the items from shelving or storage into the cart.

In many conventional systems, the facility operator may provide an input or otherwise scan a bar code or other identifier (such as associated with the shelving position of the item) and enter a number of units as the item is placed in the order cart to record the pick event. Unfortunately, mistakes associated with scanning and picking items for the order cart may occur from time to time. For example, in some cases, the facility operator may input a correct item, scan the correct identifier, and/or enter the expected unit number but may place the wrong item (such as an adjacent item) in the order cart. As another example, the user may scan the identifier and fail to place the item in the cart, such as when the operator is distracted mid-pick. In some cases, the item may not be labeled with a correct identifier and/or the item may be placed at the wrong location on the shelf (e.g., bin, shelf, conveyor belt, pick area, or the like). In this example, a facility operator may scan the correct identifier associated with the shelving, but the item may still be incorrect, and the wrong item may be placed on the order cart. In other examples, an item may include multiple identifiers (such as a reused carton, box, container, or the like), which may also result in mistakes during the picking event.

In some examples, the system, discussed herein, is configured to track the facility operator as the operator performing the picking event. For instance, the facility may be equipped with sensors positioned about the facility (such as along a surface—wall, ceiling, and the like of the facility), on the operator (e.g., a head or body sensor), associated with the order cart, associated with other vehicles on site, or the like. In at least some examples, the sensors may include thermal sensors, time-of-flight sensors, location sensors, LIDAR sensors, SWIR sensors, radar sensors, sonar sensors, infrared sensors, image devices or cameras (e.g., RGB, IR, intensity, depth, etc.), Muon sensors, microphone sensors, environmental sensors (e.g., temperature sensors, humidity sensors, light sensors, pressure sensors, etc.), and the like. In some examples, the sensors may include multiple instances of each type of sensors. For instance, camera sensors may include multiple cameras disposed at various locations.

The sensor data captured and generated by the sensors may be provided to an event tracking system. The event tracking system may combine or otherwise correlate the sensor data from the various sensors, segment the sensor data, and classify the segmented sensor data to determine objects (such as picked items) from the sensor data. For example, the system may utilize one or more machine learned models and/or networks to segment and classify the sensor data (such as the image data of the pick event). In these examples, the system may then determine if the correct item and the correct number of items were placed in the order cart during the pick event. If the pick event was successful (e.g., the correct number of the correct items were placed in the order cart), then the system may provide an alert or notification to the operator to continue with the pick event and place the next item or set of items in the order cart. However, if the event was unsuccessful (e.g., an incorrect item or incorrect number of items were placed in the cart), the system may send an alert or notification to the operator to halt the pick event and correct the error. For example, the operator may place the items picked back on the shelf and then reperform the pick event.

In some cases, the order cart may include a display that has a grid representative of the shelfing. The display may include, for instance, red and green lights. The display may display a green light and a number. The green light indicates the location of the item on the shelf and the number indicates the number of units to pick. In this example, the system may also receive the display data (either extracted from the sensor data or from another facility system, such as the system controlling the display). The system may then determine from the sensor data the location of the pick, the item picked, and/or a number of units placed in the cart. The system may then compare the location of the pick, the item picked, and/or a number of units placed in the cart with the display data to determine if the pick event was successful or unsuccessful.

In some examples, the alert may include an audio alert, visible alert, text-based alert or the like. For example, the alert may cause the display to flash (e.g., the display may flash, the incorrect item may flash on the grid with a third color, such as yellow, or a text-based message with additional instructions may appear). In other cases, the alert may be an audible alarm or message output by a speaker associated with the order cart or the like. By providing the alerts and causing corrective actions in substantially real-time the system may, thereby, prevent delays caused by use of an order cart audit or the like.

In some cases, the system may also capture sensor data associated with the item returning to the shelf (e.g., associated with the correction event). The system may again correlate, align, segment, and/or classify the sensor data to determine if the incorrectly picked item is properly returned to the correct shelfing location (e.g., a bin, shelf, conveyor belt location, pick area, or the like). In these cases, the system may again confirm the identity of the item returned and the location prior to providing instructions to the operator to return to picking items (such as to repick the previously incorrectly picked item).

In some cases, the system may also record or store data associated with a number of incorrect picks, the identity of incorrectly picked item, an amount of time added to the pick event due to the incorrectly picked item, an identity of the operator, as well as other metrics associated with the erroneous picked item. In these cases, the system may determine if multiple operators incorrectly pick the same item and, thereby, generate corrective measures or suggestions, such as moving the location of the item within the facility. For example, two physically similar items may be located adjacent to each other. By moving one of the items, the system may thereby reduce the number of erroneous or incorrect picks caused by the items adjacent location.

As discussed herein, the event tracking system may process the sensor data using one or more machine learned models and/or networks. As described herein, the machine learned models may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

In some examples, the sensor system installed with respect to a vehicle or cart associated with the facility may include one or more multiple IoT devices. The IoT computing devices may include a smart network video recorder (NVR) or other type of EDGE computing device. Each IoT device may also be equipped with sensors and/or image capture devices, such as visible light image systems, infrared image systems, radar based image systems, LIDAR based image systems, SWIR based image systems, Muon based image systems, radio wave based image systems, and/or the like. In some cases, the IoT computing devices may also be equipped with models and instructions to capture, parse, identify, and extract information associated with a collection or delivery event, as discussed above, in lieu of or in addition to the cloud-based services. For example, the IoT computing devices and/or the cloud-based services may be configured to perform segmentation, classification, attribute detection, recognition, data extraction, and the like.

FIG. 1 is an example block diagram of a facility 100 utilizing an event tracking system 102 to monitor pick events, according to some implementations. As discussed above, errors during pick events (such as miss-picks or missed items) often results in high-levels of delay and costs (e.g., replacement costs) associated with product storage, shipping, and sales. The facility 100, illustrated herein, may utilize the event tracking system 102 to detect, diagnose, and correct errors during a pick event in substantially real-time by notifying an operator as to the error or miss-pick during the pick event. In this manner, unlike conventional systems that utilize random human audits of the order carts, the error may be corrected prior to other items being added to the cart.

In this example, the facility 100 may include a plurality of pick locations, 104 currently illustrated as shelves. The facility 100 may also include a number of order carts 106 that may be autonomous or operated by a stocker, packer, clerk, material handler, or the like (e.g., an operator). The facility 100 may also be equipped with sensor systems 108 to capture and generate sensor data associated with the pick events. In the current example, the sensor systems 108 are mounted with respect to the facility 100, however, it should be understood, that the sensor system 100 may be associated with the operator (such as a worn sensor), the order carts 106 (e.g., sensors associated with the order cart), or mounted elsewhere through the facility 100. In some cases, the sensor system 100 may also be in communication (e.g., wired or wireless) with the event tracking system 102.

The event tracking system 102 may also be in wireless communication with the order carts 106. For example, the order carts 106 may be equipped with a display that presents a grid presentation of the pick location 104 associated with the current pick event. Various indicators (such as red and green lights) may be displayed with respect to the grid to instruct the operator to select items from the pick location 104 for placement in the order cart 106. The event tracking system 102 may have access to the display and/or the sensor system 108 may provide sensor data representing the display.

In the current example, as the operator arrives at a pick location 104 and initiates a pick event, the sensor systems 108 may generate sensor data associated with the pick event. The sensor data of the pick event may be provided to the event tracking system 102. The event tracking system 102 may process, parse, segment, and classify the sensor data to extract and/or determine an identity of each item picked from the pick location 104. The event tracking system 102 may then compare each identity of each item picked to the pick list associated with the pick location 104. In some cases, the event tracking system 102 may also determine a number of each identical item picked during the pick event.

The event tracking system 102 may determine if one or more error occurred during the pick event. For example, the error may include, but is not limited to, an item picked that is absent from the pick list (e.g., an incorrect item is picked), the wrong number of items are picked (e.g., too many or too few of the item are picked), an item was missed (e.g., the operator failed to pick and item on the pick list), or the like.

In some cases, the system 102 may allow the operator to complete the pick event prior to reporting any issues or errors detected. In other cases, the event tracking system 102 may notify or alert the operator to the issue or error at the time the error is detected. For example, the event tracking system 102 may detect an error, such as the operator picking an item that is not on the pick list, based at least in part on a comparison of item data (e.g., the identity of the item) determined from the sensor data and the pick list. The event tracking system 102 may then cause the operator to receive an alert as to the miss-picked item in substantially real-time. For instance, the system 102 may cause the display of the order cart 106 to present an alert indictor to the operator. As some illustrative examples, the alert indicator may include a text based notification, a flashing or other visual indication of the error, an image and/or description of the miss-picked item, correction instructions, and/or the like.

Upon a detecting and alerting of the miss-pick during the event, the sensor systems 108 may capture additional sensor data associated with the corrective action by the operator. The additional sensor data may also be provided to the event tracking system 102. The event tracking system 102 may again process, parse, segment, and classify the additional sensor data to determine if the operator took a corrective action and if the corrective action was appropriate (e.g., recommended and/or correct). For example, the system 102 may determine if the correct item was removed from the order cart 106 and if the miss-picked item was properly returned to the pick location 104. Once the system 102 determines the corrective action was appropriate, the event tracking system 102 may send an approval notification (such as via the display of the order cart 106) instructing the operator to resume the pick event and/or proceed to the next pick location 104.

Figure 2:
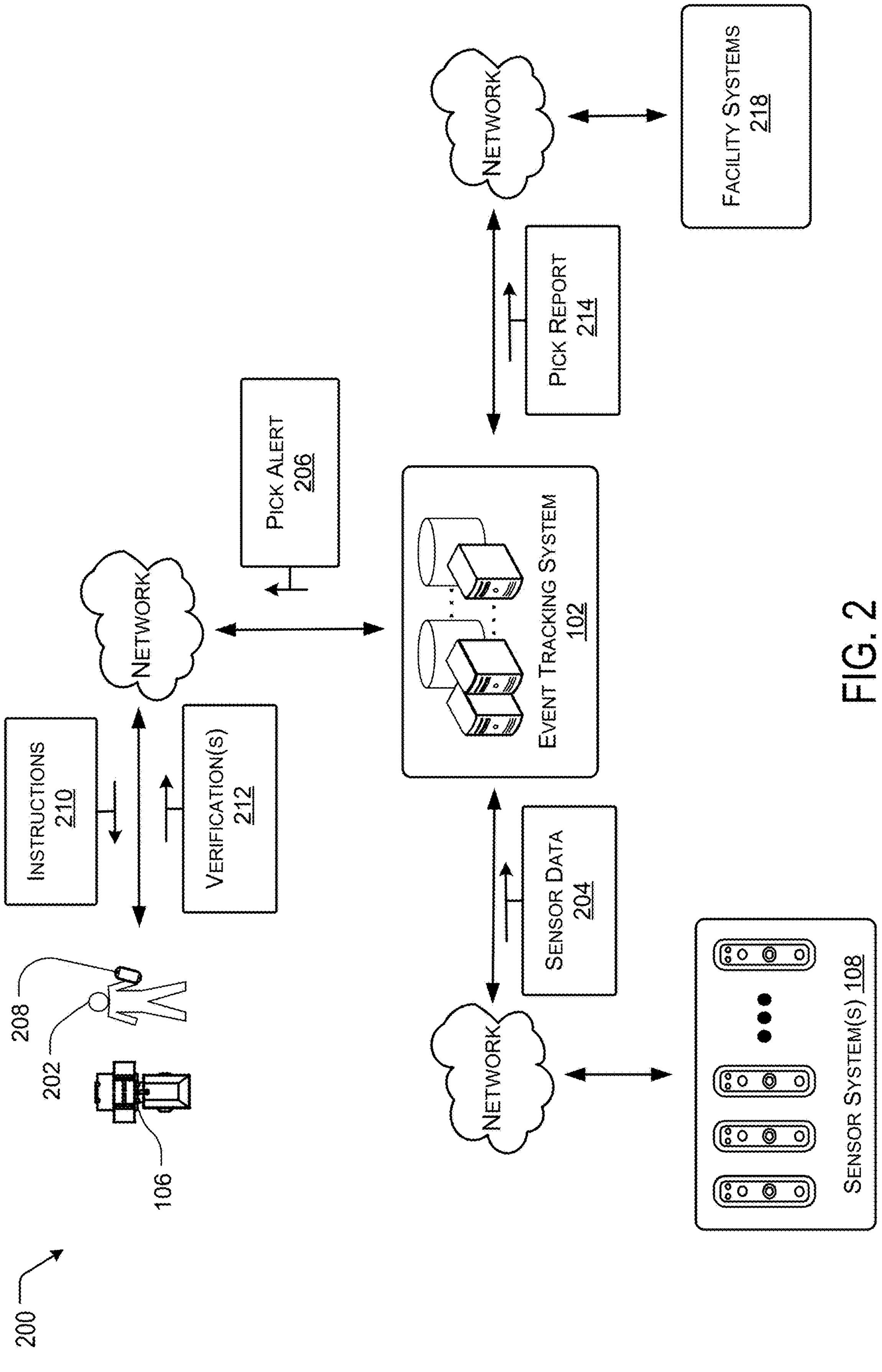
FIG. 2 is an example block diagram of the event tracking system of FIG. 1, according to some implementations.

While the pick locations 104 are illustrated as shelves in this example, it should be understood that the pick locations 104 may include fulfillment areas, conveyor belts, desks, and the like. It should also be understood that in the current example that the order carts 106 are shown as movable carts with baskets that traverse the floor of the facility 100, however, the order carts 106 may be bins, boxes, a transport handling unit (THU), pallets, unit load devices (ULDs), ocean containers, airfreight units, walkie riders, autonomous tugs (or other vehicles), any object that may carry or otherwise transport a product, inventory items, and the like FIG. 2 is an example block diagram 200 of the event tracking system 102 of FIG. 1, according to some implementations. As discussed above, mistakes or errors, such as miss-picking items or skipping items during a pick event, may result in high-levels of delays and costs (e.g., replacement costs, re-shipping costs, return costs, and the like) associated with product storage, shipping, and sales. The event tracking system 102 may be configured to reduce the number of errors or mistakes made during a pick event by monitoring the operator 202 as the items are placed into an order cart. In this manner, the system 102 may reduce delays and costs associated with product delivery.

In the current example, sensors systems 108 may be positioned throughout the facility, mounted on an order cart 106, worn by an operator 202, and the like. The sensors may generate sensor data 204 that may be associated with a pick event at a pick location, as discussed above. The sensor data 204 may be received by the event tracking system 102 during the pick event, such as streamed data from each of the sensor systems 108. In some cases, the event tracking system 102 may also include computer vision and/or augmented reality associated with wearables assigned and worn by one or more operators.

As discussed above, the event tracking system 102 may determine the identity of items being placed in the order cart 106 by the operator 202 as each item is picked. In some cases, the system 102 may also determine an item count for each class or type of item being picked. For example, if the order included multiple units of an item, the system 102 may determine the identity of each item and increase a counter for the item class or type each time an identical item is placed in the order cart 106.

As the items are picked, the event tracking system 102 may also determine if the item is expected (e.g., associated with the order being fulfilled). If the item is expected, the system 102 may continue to monitor the pick event. However, if the item is unexpected, the system 102 may generate a pick alert 206 that may be provided to the operator 202. For example, if the item is incorrect (e.g., not associated with the order), the system 102 may generate the pick alert 206 which may be provided to a display, speaker, or the like associated with the order cart 106, to a headset, intercom, or other system worn by the operator 202, to an electronic device 208 associated with the operator 202, and/or the like. In some cases, the pick alert 206 may include or be followed by instructions 210 for remediating the miss-pick. For example, the pick alert 206 may cause the operator 202 to halt activities associated with the pick event and the instructions 210 may provide steps for remediating the miss-pick. In some cases, the instructions 210 may include indications of the item not associated with the order (such as item identifiers, images, and the like), a return location for the operator 202 to place the item back on the shelf, indications of the correct item (such as item identifiers, images, and the like), and other information usable to assist the operator 202 in returning the miss-picked item and selecting the correct item.

In some cases, the picked assets or items may be stacked in building a full or partial pallet. In such instances, the sensor systems may utilize multiple sensors to ensure the pick accuracy along with stacking order such that heavier products are not placed over lighter products that may lead to product damage. In some cases, the same sensor systems 108 and/or data generated by the sensor systems 108 may also be used to track picker efficiency and compliance to defined SOPs (Standard Operating Procedures), which may in turn be used to reinforce operator (e.g., personnel) training and improve process compliance. In some cases, more accurate and efficient pickers can be rewarded with a gamified score that may be tied to a personal incentive through picking process gamification. The real-time feedback to the operator may also be provided through voice using audio headsets or using an augmented reality powered smart wearable.

In some examples, the operator 202 may also provide a verification 212 of the item being returned to the shelf. For example, the operator 202 may capture an image of the item, scan an identifier on the item, or the like using the electronic device 208 and provide the image or scan as a verification 212 to the event tracking system 102. The operator 202 may also verify the correct item being placed into the order cart 106 via an image, scan, or the like. In other examples, the verification 212 of the item return may be determined by the event tracking system 102 using the sensor data 204 associated with and representing the operator 202 returning the item to the shelf (such as additional data captured at a time subsequent to the miss-pick) or a storage racking area. In these examples, the system may also send a second pick alert 206 to the operator 202 instructing the operator 202 to resume activity associated with the pick event.

In some implementations, once a pick event has elapsed (e.g., all items are placed in the order cart 106), the event tracking system 102 may generate a pick report 214. The pick report 214 may include a record of any miss-picks and the data associated therewith. In some cases, the pick report 214 may also include data such as the operator's identity, elapsed time associated with the pick event, items picked, order cart identity, pick location data, and the like. In some cases, the pick report 214 may be provided to another facility system 218 (such as an inventory management system, packaging system, audit system, or the like), a facility manager, a delivery agent, customer system, a shipping system, or the like.

In some cases, the picked order cart106 (or pallet, THU, or the like) may be monitored and/or tracked all through the warehouse to a staging area next to the dock door for final manifest printing or taken directly inside a trailer parked in a dock door. In such cases, the sensor systems 108 may also track if the initial operator 202 or the staging area operator places the order cart or the pallet on to the trailer parked in the correct dock door along with the correct manifest. This tracking may occur using virtual asset identifiers that are assigned to the order cart 106 by the sensor systems 108 in case no labels or manifests have been assigned until the staging area. In some cases, an additional sensor tower may also be used to perform scan of the outbound inventory to perform reconciliation against the initial order or the manifest to perform necessary audit and corrections.

In the current example, the data, instructions, verifications, and/or alerts may be transmitted to the event tracking system 102 using networks. The networks may be any type of network that facilitates compunction between one or more systems and may include one or more cellular networks, radio, WiFi networks, short-range or near-field networks, infrared signals, local area networks, wide area networks, the internet, and so forth. In the current example, each network is shown as a separate network but it should be understood that two or more of the networks may be combined or the same.

Figure 3:
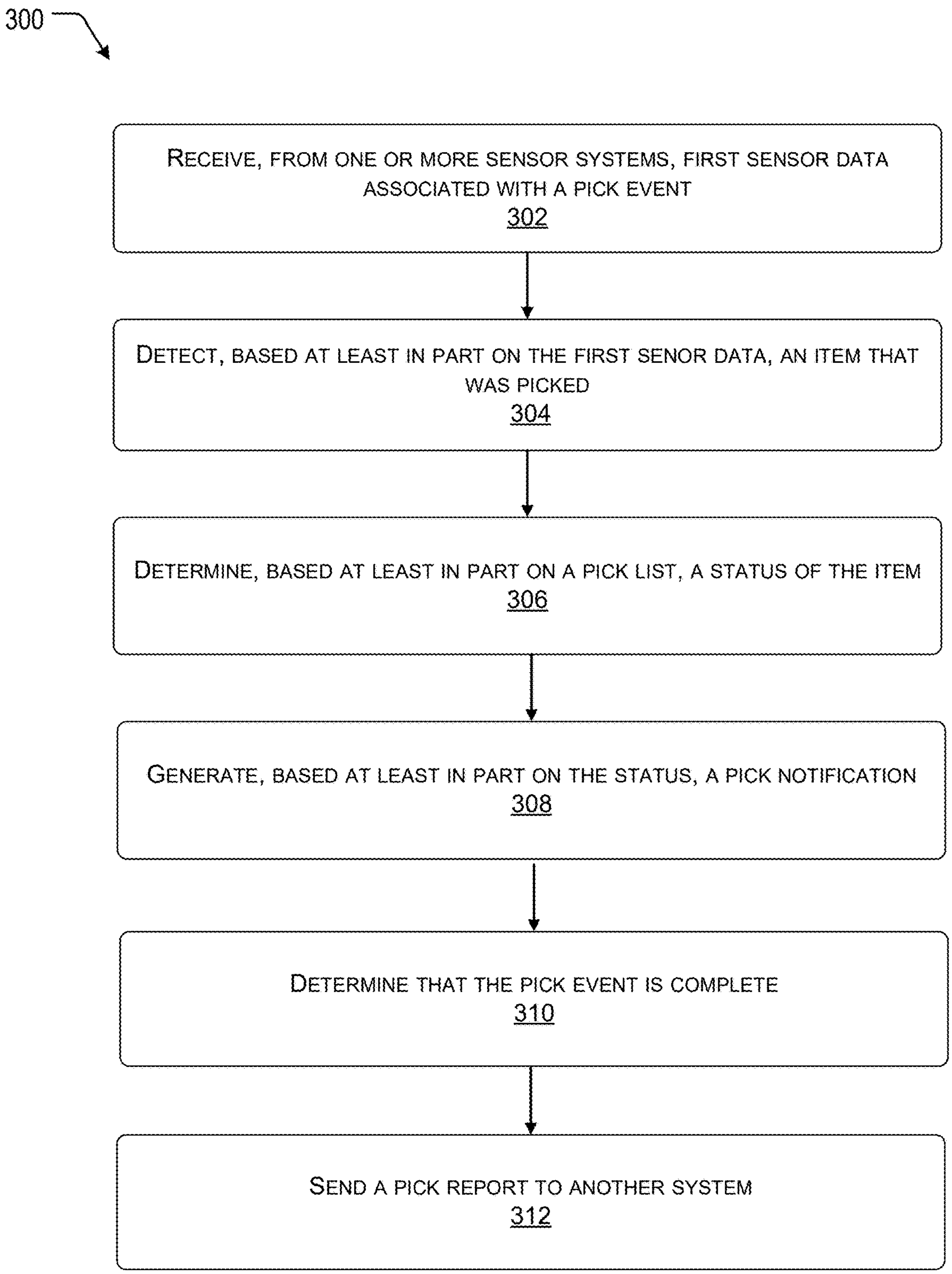
FIG. 3 is a flow diagram illustrating an example process associated with tracking a pick event, according to some implementations.
Figure 4:
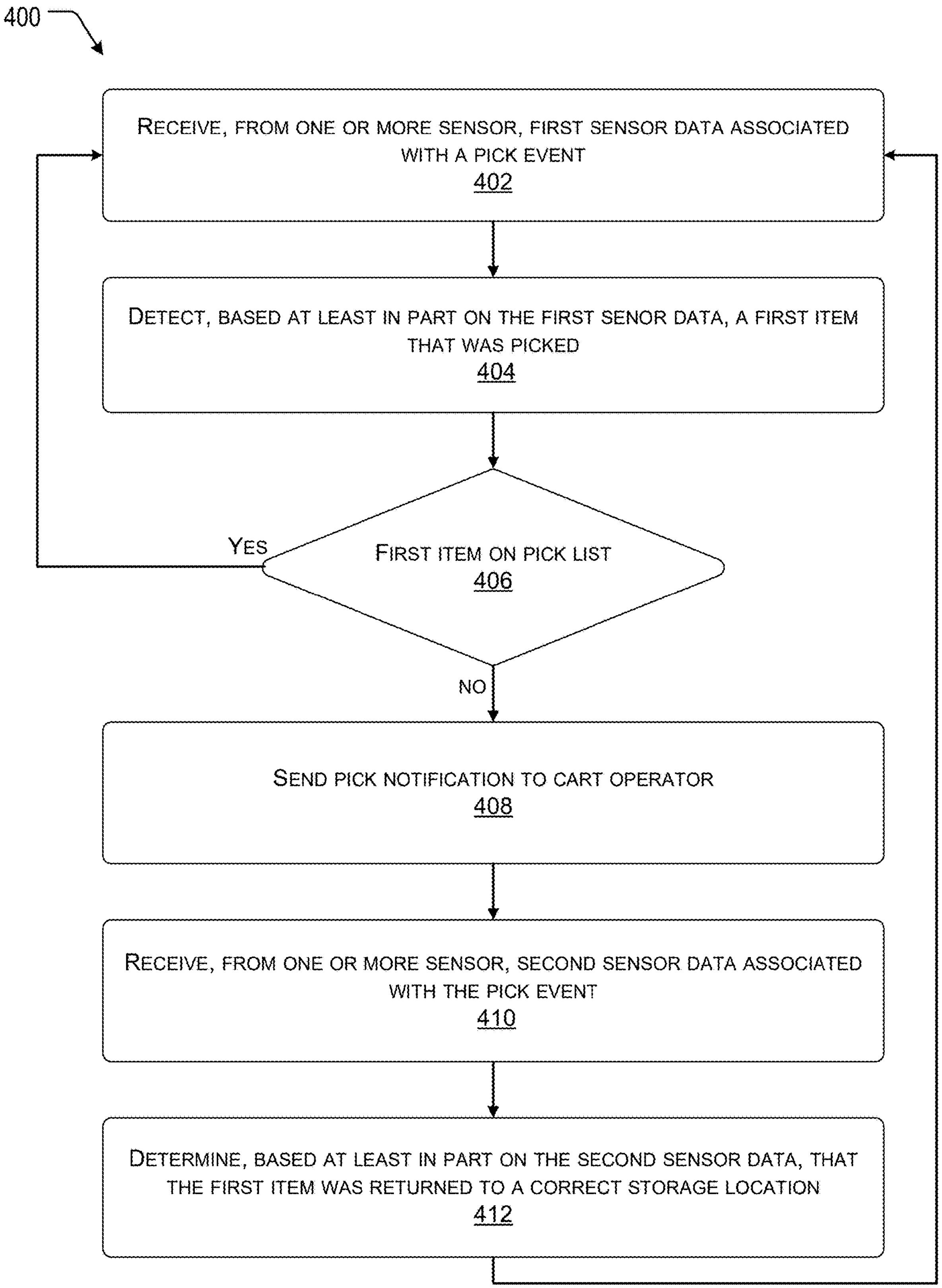
FIG. 4 is another flow diagram illustrating an example process associated with tracking a pick event, according to some implementations.
Figure 5:
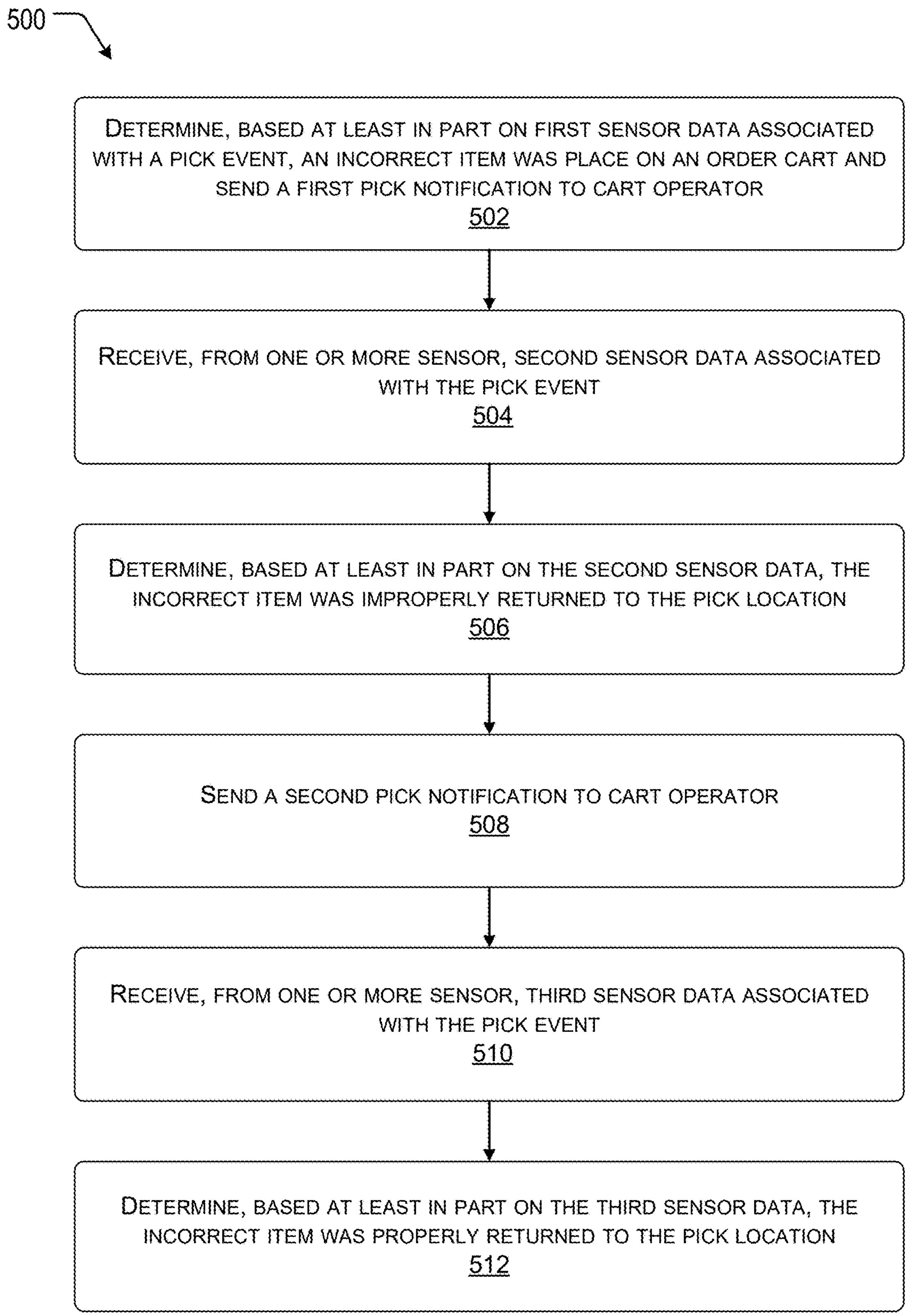
FIG. 5 is another flow diagram illustrating an example process associated with tracking a pick event, according to some implementations.

FIGS. 3-5 are flow diagrams illustrating example processes associated with the event tracking system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processor(s), perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 3 is a flow diagram illustrating an example process 300 associated with tracking a pick event, according to some implementations. As discussed above, an event tracking system may be configured to monitor one or more pick events associated with a facility and provide alerts to any errors or issues associated therewith.

At 302, the event tracking system may receive, from one or more sensor systems, first sensor data associated with a pick event. In some cases, the event tracking system may utilize data generated by the sensor system positioned throughout the facility, equipped on order carts, and/or worn by facility operators. The sensor data may include image data, video data, thermal data, position data, and the like.

At 304, the event tracking system may detect, based at least in part on the first sensor data, an item that was picked. For example, the system may process, segment, and/or classify the first sensor data using one or more machine learned models trained on image data associated with inventory items of the facility. In some cases, detecting the item may include determining an identity of the item. The identity may include detecting a packaging, labels, and/or individual items. In some cases, the system may also utilize the location from which the item was picked (e.g., the shelf position, conveyor position, or the like) to assist in determining the item identity.

At 306, the event tracking system may determine, based at least in part on a pick list, a status of the item. For example, the pick list may be an order, a partial order, a build list, or the like. The status may include the item's state (e.g., partially assembled, assembled, multi-item unit, presence on the pick list, or the like). In some cases, the status of the item may include picked/unpicked and be presented on a display, for instance, associated with the order cart such that the operator may track the completion level of the pick list.

At 308, the event tracking system may generate, based at least in part on the status, a pick notification. For example, the system may update the display to show the item has been picked and the task associated therewith is complete. In other cases, the pick notification may be an alert to notify the operator that an incorrect item was picked, an item was missed, an item was picked in the wrong order, or the like. For example, in some cases, the items may be picked in a desired order or arrangement for packing and shipping (e.g., larger and/or heavier items placed on the bottom). In these cases, the system may issue a pick notification or pick alert upon detecting an item was picked out of order or placed on the order cart out of arrangement.

At 310, the event tracking system may determine that the pick event is complete. For example, the event tracking system may determine, based at least in part on the sensor data, each item associated with the pick list has been correctly arranged and/or placed in the order cart with no additional or missing items.

At 312, the event tracking system may, in response to the completion, send a pick report to another system. The pick report may include a record of any miss-picks and the data associated therewith. In some cases, the pick report may also include data such as the operator's identity, elapsed time associated with the pick event, items picked, order cart identity, pick location data, and the like. In some cases, the pick report may be provided to another facility system (such as an inventory management system, packaging system, audit system, or the like), a facility manager, a delivery agent system, a customer system, a shipping system, or the like.

FIG. 4 is another flow diagram illustrating an example process 400 associated with tracking a pick event, according to some implementations. In some cases, a miss-pick event may occur when an operator selects the wrong item from the picking location and places it in the cart. In these cases, the event tracking system, discussed herein, may detect the miss-pick event, alert the operator, and confirm a corrective action has been performed prior to the operator resuming activities associated with the pick event.

At 402, the event tracking system may receive, from one or more sensor systems, first sensor data associated with a pick event. In some cases, the event tracking system may utilize data generated by the sensor system positioned throughout the facility, equipped on order carts, and/or worn by facility operators. The sensor data may include image data, video data, thermal data, position data, and the like.

At 404, the event tracking system may detect, based at least in part on the first sensor data, a first item that was picked. For example, the system may process, segment, and/or classify the first sensor data using one or more machine learned models trained on image data associated with inventor items of the facility. In some cases, detecting the first item may include determining an identity of the first item. The determining of the identity may include detecting a packaging, labels, and/or individual items. In some cases, the system may also utilize the location from which the first item was picked (e.g., the shelf position, conveyor position, or the like) to assist in determining the first item identity.

At 406, the system may determine if the first item is associated with or on a pick list associated with the pick event. For example, the system may compare the identity of the first item to the identity of the items on the pick list to determine if there is a match. In some cases, the system may also confirm that a quantity of the item associated with the pick list is not exceeded by the placement of the first item into the order cart. If the first item is on or associated with the pick list, the process 400 may return to 402 and receive additional sensor data. Otherwise, the process 400 proceeds to 408.

In other cases, the system may confirm if the first item is the next item to be placed or arranged on the cart. For example, the pick list may require a particular order (such as heavy items placed first and below lighter items). In this example, even if the first item is on the list, if the first item is not the next item, the process 400 may proceed to 408.

At 408, the event tracking system may send a pick notification to the cart operator. For instance, the pick notification may be an alert to notify the operator that an incorrect item was picked, an item was missed, an item was picked in the wrong order, or the like. In some examples, the system may issue a pick notification or pick alert upon detecting an item was picked out of order or placed on the order cart out of arrangement. In some examples, the pick notification may cause a display associated with the operator (such as on an electronic device or a display associated with the order cart) to display data associated with the miss-picked item (e.g., images, identifiers, return location, cart location, and the like) or an audio alert in a voice picking headset used in warehousing operations. In some cases, the sensor system may also track labor efficiency and adherence to warehouse safety standards. In some cases when a picker fails to take a correction action, the event tracking system may capture the exception as an audit trail and/or alert a supervisor.

At 410, the event tracking system may receive, from one or more sensor systems, second sensor data associated with a pick event. In some cases, the event tracking system may utilize the second data to determine if the miss-picked item is returned to the proper pick location and/or if adequate corrective action was taken by the operator.

At 412, the event tracking system may determine, based at least in part on the second sensor data, that the first item was returned to the correct storage location. In other examples, the system may determine that the first item was moved to a correct location with respect to the other items of the pick list (such as to correct an ordering or arrangement for shipping), or the like. The process 400 may then return to 402 to monitor the reminder of the pick event.

FIG. 5 is another flow diagram illustrating an example process 500 associated with tracking a pick event, according to some implementations. As discussed above, a miss-pick event may occur when an operator selects the wrong item from the picking location and places it in the cart. In these cases, the event tracking system, discussed herein, may detect the miss-pick event, alert the operator, and confirm a corrective action has been performed prior to the operator resuming activities associated with the pick event.

At 502, the event tracking system may determine, based at least in part on first sensor data associated with a pick event, that an incorrect item was placed on an order cart and send a first pick notification to the cart operator. For example, the event tracking system may receive, from one or more sensor systems, first sensor data associated with the incorrect item. The event tracking system may then detect, based at least in part on the first sensor data, the incorrect item that was picked. For example, the system may process, segment, and/or classify the sensor data using one or more machine learned models trained on image data associated with inventor items of the facility. In some cases, detecting the incorrect item may include determining an identity of the incorrect item. The determining of an identity may include detecting a packaging, labels, and/or individual items. In some cases, the system may also utilize the location from which the incorrect item was picked (e.g., the shelf position, conveyor position, or the like) to assist in determining the first item identity. In some examples, the system may determine if the incorrect item is associated with or on a pick list associated with the pick event. For example, the system may compare the identity of the incorrect item to the identity of the items on the pick list to determine if there is a match.

In some cases, the pick notification may be an alert to notify the operator that an incorrect item was picked, an item was missed, an item was picked in the wrong order, or the like. In some examples, the system may issue a pick notification or pick alert upon detecting an item was picked out of order or placed on the order cart out of arrangement. In some examples, the pick notification may cause a display associated with the operator (such as on an electronic device or a display associated with the order cart) to display data associated with the miss-picked item (e.g., images, identifiers, return location, cart location, and the like).

At 504, the event tracking system may receive, from one or more sensor systems, second sensor data associated with the pick event. In this example, the sensor data may be associated with a corrective action of the operator in response to receiving the pick notification. The sensor data may include image data, video data, thermal data, position data, and the like.

At 506, the event tracking system may determine, based at least in part on second sensor data (e.g., sensor data of the corrective action), that the incorrect item was improperly returned to the pick location (e.g., storage location). For example, the system may confirm the identity of the incorrect item in the second sensor data and the location that the incorrect item was returned to with respect to the facility. In this example, the system may determine either that the item is not the incorrect item (e.g., the operator returned another item that is on the pick list to the pick location) or that the incorrect item was returned to an incorrect location with respect to the facility (e.g., the wrong shelf, bin, or the like).

At 508, the event tracking system may send a second pick notification to the cart operator. For instance, the second pick notification may be an alert to notify the operator that the corrective action failed. As discussed above, in some examples, the pick notification may cause a display associated with the operator (such as on an electronic device or a display associated with the order cart) to display data associated with the incorrect item (e.g., images, identifiers, return location, cart location, and the like). Such feedback may also be sent to a labor management system for determining an efficiency, pick accuracy, and adherence to process compliance metric associate with each operator.

At 510, the event tracking system may receive, from one or more sensor systems, third sensor data associated with the pick event. In this example, the third sensor data may be associated with a second corrective action of the operator in response to receiving the second pick notification. The third sensor data may include image data, video data, thermal data, position data, and the like.

At 512, the event tracking system may determine, based at least in part on the third sensor data, that the incorrect item was properly returned to the pick location (e.g., storage location). For example, the system may confirm the identity of the incorrect item in the third sensor data and the location that the incorrect item was returned to with respect to the facility upon receiving the second alert. In this example, the system may determine either that the item is the incorrect item and that the incorrect item was returned to a correct location with respect to the facility (e.g., the correct shelf, bin, or the like).

Figure 6:
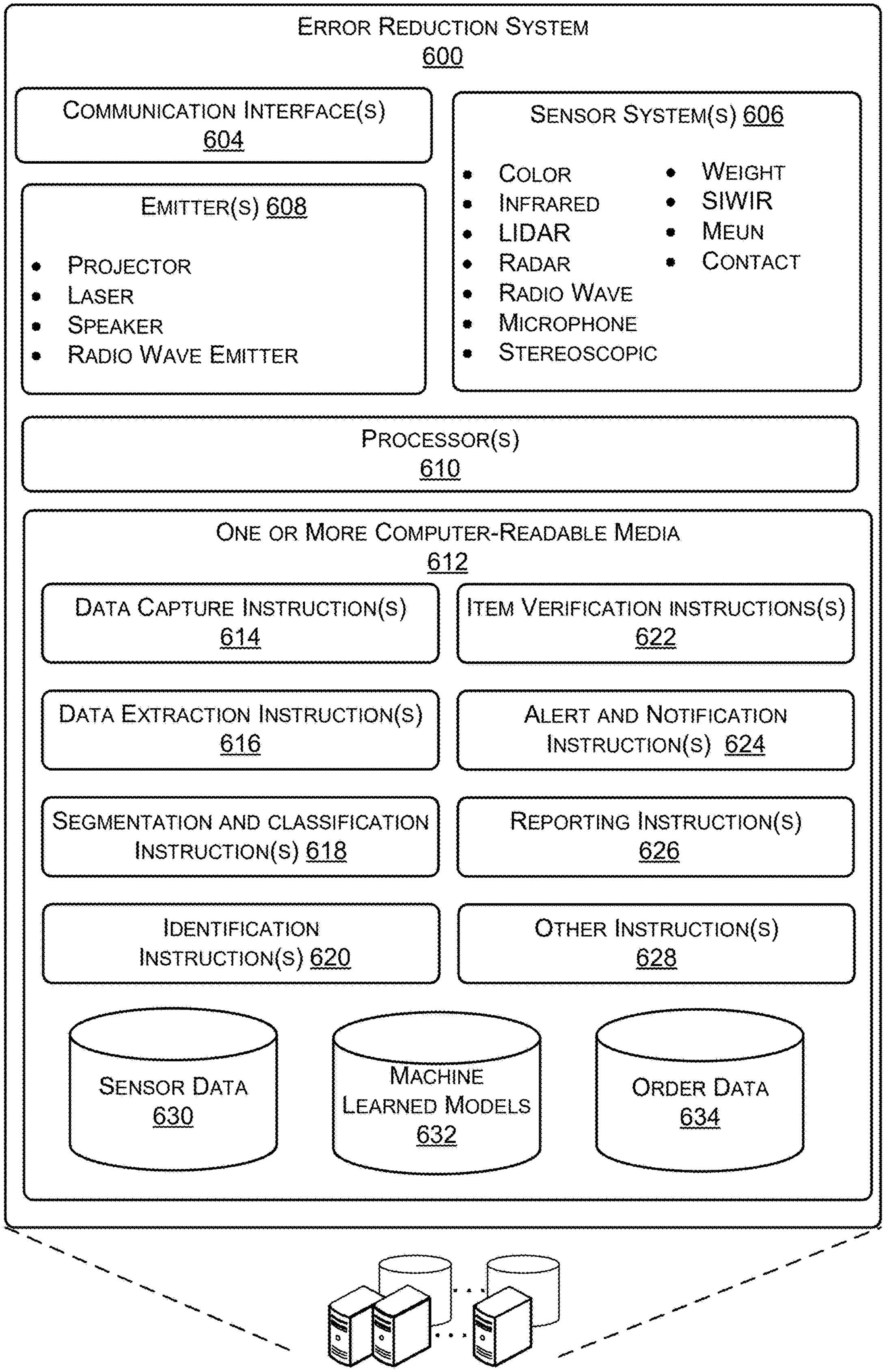
FIG. 6 is an example event tracking system that may implement the techniques described herein according to some implementations.

FIG. 6 is an example event tracking system that may implement the techniques described herein according to some implementations. The system 600 may include one or more communication interface(s) 604 (also referred to as communication devices and/or modems), one or more sensor system(s) 606, and one or more emitter(s) 608.

The system 600 can include one or more communication interface(s) 604 that enable communication between the system 600 and one or more other local or remote computing device(s) or remote services, such as a cloud-based service of FIG. 2. For instance, the communication interface(s) 604 can facilitate communication with other proximate sensor systems and/or other facility systems. The communications interfaces(s) 604 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The one or more sensor system(s) 606 may be configured to capture the sensor data 630 associated with an order cart. In at least some examples, the sensor system(s) 606 may include thermal sensors, time-of-flight sensors, location sensors, LIDAR sensors, SIWIR sensors, radar sensors, sonar sensors, infrared sensors, cameras (e.g., RGB, IR, intensity, depth, etc.), Muon sensors, microphone sensors, environmental sensors (e.g., temperature sensors, humidity sensors, light sensors, pressure sensors, etc.), and the like. In some examples, the sensor system(s) 1006 may include multiple instances of each type of sensors. For instance, camera sensors may include multiple cameras disposed at various locations.

The system 600 may also include one or more emitter(s) 608 for emitting light and/or sound. By way of example and not limitation, the emitters in this example include light, illuminators, lasers, patterns, such as an array of light, audio emitters, and the like.

The system 600 may include one or more processors 610 and one or more computer-readable media 612. Each of the processors 610 may itself comprise one or more processors or processing cores. The computer-readable media 612 is illustrated as including memory/storage. The computer-readable media 612 may include volatile media (such as random access memory (RAM)) and/or nonvolatile media (such as read only memory (ROM), Flash memory, optical disks, magnetic disks, and so forth). The computer-readable media 612 may include fixed media (e.g., RAM, ROM, a fixed hard drive, and so on) as well as removable media (e.g., Flash memory, a removable hard drive, an optical disc, and so forth). The computer-readable media 612 may be configured in a variety of other ways as further described below.

Several modules such as instructions, data stores, and so forth may be stored within the computer-readable media 612 and configured to execute on the processors 610. For example, as illustrated, the computer-readable media 612 stores data capture instructions 614, data extraction instructions 616, segmentation and classification instructions 618, item verification instructions 620, alert and notification instructions 622, reporting instruction 624 as well as other instructions 628, such as an operating system. The computer-readable media 612 may also be configured to store data, such as sensor data 630, machine learned models 632, and order data 634, as well as other data.

The data capture instructions 614 may be configured to cause the sensor systems 606 to capture and/or generate image data associated with a pick event. In some cases, the data capture instructions 614 may cause the sensor systems 606 to zoom, pan, tilt, or otherwise capture multiple images of a pick event, such as from multiple angles. In some case, the data capture instructions 614 may be configured to control timing of multiple image devices (such as synchronization) as well as other characteristics, such as shutter speed, aperture size, lighting, and the like.

The data extraction instructions 616 may be configured to extract data such as identity, status, quality, damage, and the like associated with an item. For example, the data extraction instructions 616 may preform optical character recognition on one or more labels associated with an item during a pick event.

The segmentation and classification instructions 618 may be configured to identify or disambiguate multiple items, assign types or classes to various items as well as determine damage or other status indicators of an item. For example, the segmentation and classification instructions 618 may generate data usable to determine an item count or disambiguate a multi-pick operation (aka the operator places multiple items in a bin or container concurrently or part of a single move or operation).

The item verification instructions 620 may be configured to verify an item with a pick list associated with the pick event based at least in part on the identity and/or item class/type determined by the data extraction instructions 616 and/or the segmentation and classification instructions 618.

The alert and notification instructions 622 may be configured to cause an alert or notification to be sent to the operator, a third party (such as a customer or facility receiving the picked items, a facility manager, or the like), or the like. For example, the alert and notification instructions 622 may cause a display associated with a pick area of the pick event to display alerts when an item is placed in a bin that is not associated with the pick list, the item is damaged, the item is a duplicate or has already exceeded a pick count for that item, or the like.

The reporting instruction 624 may be configured to provide a report such as a status, completion, metrics (e.g., pick time, pick accuracy, or the like) of the pick event and/or the operator performing the pick event to a facility system, such as a system associated with a manager or the like. In some cases, if the pick event is automated or robotic the report may be sent to a system associated with the operator that is managing or supervising multiple robotic or automated pick events concurrently to reduce overall complicity of supervising multiple pick areas.

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A method comprising: receiving first sensor data associated with a pick event; determining, based at least in part on the first sensor data, an identity of a first item; determining, based at least in part on a pick list associated with the pick event, a status of the first item; and sending a notification to a device associated with an operator performing the pick event, the notification associated with the first item and including an action to be performed by the operator.

B. The method of A, wherein the notification is a control signal and the operator is a robotic system, the control signal to cause the robotic system to perform the action. the vehicle.

C. The method of any of A-B, wherein the action to be performed by the operator is a removal of the first item from an order cart associated with the pick event.

D. The method of C, further comprising: receiving second sensor data associated with the pick event, the second sensor data received subsequent to sending the notification; determining, based at least in part on the second sensor data, an updated status of the first item; determining, based at least in part on the second status, that the first item was returned to an original storage location; and sending a second notification to the device associated with the operator performing the pick event, the second notification associated indicating that the operator may continue to perform operations associated with the pick event.

E. The method of any of the A-C, wherein the status of the first item is a class or type and determining the status of the first item further comprises inputting the sensor data into one or more machine learned models to segment and classify the sensor data.

F. The method of any of the A-E, further comprising sending a pick report including the status of the first item to a facility system associated with a party other than the operator.

G. The method of any of the A-F, wherein sending the notification to the device causes the device to display a color indicator associated with the status and a count associate with a type of the item.

H. The method of any of the A-G, further comprising: receiving second sensor data associated with the pick event; determining, based at least in part on the second sensor data, an identity of a second item; determining, based at least in part on a pick list associated with the pick event, a status of the second item; sending a second notification to the device associated with the operator performing the pick event, the notification associated with the second item and including a second action to be performed by the operator; and wherein sending the second notification cause the device to display a second color indicator associated with the status of the second item and a second count associate with a second type of the second item.

I. The method of any of any of the A-H, further comprising presenting instructions on a display associated with the entry location, the instructions including direction to at least one of an unloading area, a waiting area, a trial delivery area, or a secondary check-in area.

J. The method of any of the A-I, further comprising: receiving a verification from the device associated with the operator in response to sending the notification, the verification indicating that the item has been returned to an original storage location.

K. The method of the J, wherein the first sensor data is received from an image device associated with an order cart.

L. A computer program product comprising coded instructions that, when run on a computer, implement a method as claimed in any of A-K.

M. A system comprising: one or more sensors; one or more processors; and one or more non-transitory computer readable media storing instructions executable by the one or more processors, wherein the instructions, when executed, cause the one or more processors to perform operations comprising: receiving first sensor data associated with a pick event; determining, based at least in part on the first sensor data, an identity of a first item; determining, based at least in part on a pick list associated with the pick event, that the first item is not associated with the pick event; and sending a notification to a device associated with an operator performing the pick event, the notification associated with the first item and including an action associated with the first item to be performed by the operator.

N. The system of M, wherein the operations further comprise: receiving second sensor data associated with the pick event, the second sensor data received subsequent to sending the notification; and determining, based at least in part on the second sensor data, a return of the first item to a shelf; and sending a second notification to the device associated with the operator performing the pick event, the second notification associated indicating that the operator may continue to perform operations associated with the pick event.

O. The system of M or N, wherein the operations further comprise receiving a verification from the device associated with the operator in response to sending the notification, the verification indicating that the item has been returned to an original storage location.

While the example clauses described above are described with respect to one particular implementation, it should be understood that, in the context of this document, the content of the example clauses can also be implemented via a method, device, system, a computer-readable medium, and/or another implementation. Additionally, any of examples may be implemented alone or in combination with any other one or more of the other examples.

What is claimed is:

1. A method comprising:

receiving first sensor data associated with a pick event;

determining, based at least in part on the first sensor data, an identity of a first item;

determining, based at least in part on a pick list associated with the pick event, a status of the first item; and sending a notification to a device associated with an operator performing the pick event, the notification associated with the first item and including an action to be performed by the operator, wherein sending the notification to the device causes the device to display a first color indicator associated with the status and a count associate with a type of the first item;

receiving second sensor data associated with the pick event;

determining, based at least in part on the second sensor data, an identity of a second item;

determining, based at least in part on a pick list associated with the pick event, a status of the second item; and sending a second notification to the device associated with the operator performing the pick event, the notification associated with the second item and including a second action to be performed by the operator, wherein sending the second notification causes the device to display a second color indicator associated with the status of the second item and a second count associated with a second type of the second item.

2. The method of claim 1, wherein the notification is a control signal and the operator is a robotic system, the control signal to cause the robotic system to perform the action.

3. The method of claim 1, wherein the action to be performed by the operator is a removal of the first item from an order cart associated with the pick event.

4. The method of claim 3, further comprising:

receiving third sensor data associated with the pick event, the third sensor data received subsequent to sending the second notification;

determining, based at least in part on the third sensor data, a third status of the first item;

determining, based at least in part on the third status, that the first item was returned to an original storage location; and sending a third notification to the device associated with the operator performing the pick event, the third notification associated indicating that the operator may continue to perform operations associated with the pick event.

5. The method of claim 1, wherein the status of the first item is a class or type and determining the status of the first item further comprises inputting the sensor data into one or more machine learned models to segment and classify the sensor data.

6. The method of claim 1, further comprising sending a pick report including the status of the first item to a facility system associated with a party other than the operator.

7. The method of claim 1, further comprising presenting instructions on a display associated with an entry location, the instructions including direction to at least one of an unloading area, a waiting area, a trial delivery area, or a secondary check-in area.

8. The method of claim 1, further comprising:

receiving a verification from the device associated with the operator in response to sending the notification, the verification indicating that the item has been returned to an original storage location.

9. The method of the claim 8, wherein the first sensor data is received from an image device associated with an order cart.

10. One or more non-transitory computer readable media storing instructions executable by one or more processors, wherein the instructions, when executed, cause the one or more processors to perform operations comprising:

receiving first sensor data associated with a pick event;

determining, based at least in part on the first sensor data, an identity of a first item;

determining, based at least in part on a pick list associated with the pick event, a status of the first item; and sending a notification to a device associated with an operator performing the pick event, the notification associated with the first item and including an action to be performed by the operator, wherein sending the notification to the device causes the device to display a first color indicator associated with the status and a count associate with a type of the first item;

receiving second sensor data associated with the pick event;

determining, based at least in part on the second sensor data, an identity of a second item;

determining, based at least in part on a pick list associated with the pick event, a status of the second item; and sending a second notification to the device associated with the operator performing the pick event, the notification associated with the second item and including a second action to be performed by the operator; and wherein sending the second notification causes the device to display a second color indicator associated with the status of the second item and a second count associated with a second type of the second item.

11. The one or more non-transitory computer readable media of claim 10, wherein the operations further comprise:

receiving third sensor data associated with the pick event, the third sensor data received subsequent to sending the second notification;

determining, based at least in part on the third sensor data, an updated status of the first item;

determining, based at least in part on the third status, that the first item was returned to an original storage location; and sending a third notification to the device associated with the operator performing the pick event, the third notification associated indicating that the operator may continue to perform operations associated with the pick event.

12. The one or more non-transitory computer readable media of claim 10, wherein the status of the first item is a class or type and determining the status of the first item further comprises inputting the sensor data into one or more machine learned models to segment and classify the sensor data.

13. The one or more non-transitory computer readable media of claim 10, wherein the operations further comprise receiving a verification from the device associated with the operator in response to sending the notification, the verification indicating that the item has been returned to an original storage location.

14. The one or more non-transitory computer readable media of claim 10, wherein the notification is a control signal and the operator is a robotic system, the control signal to cause the robotic system to perform the action.

15. A system comprising:

one or more sensors;

one or more processors; and one or more non-transitory computer readable media storing instructions executable by the one or more processors, wherein the instructions, when executed, cause the one or more processors to perform operations comprising:

receiving first sensor data associated with a pick event;

determining, based at least in part on the first sensor data, an identity of a first item;

determining, based at least in part on a pick list associated with the pick event, that the first item is not associated with the pick event; and sending a notification to a device associated with an operator performing the pick event, the notification associated with the first item and including an action associated with the first item to be performed by the operator;

receiving second sensor data associated with the pick event, the second sensor data received subsequent to sending the notification; and determining, based at least in part on the second sensor data and determining that the first item is not associated with the pick event, a return of the first item not associated with the pick event to a shelf; and sending a second notification to the device associated with the operator performing the pick event, the second notification indicating that the operator may continue to perform operations associated with the pick event.

16. The system of claim 15, wherein the operations further comprise receiving a verification from the device associated with the operator in response to sending the notification, the verification indicating that the item has been returned to an original storage location.

17. The method of claim 1, further comprising:

receiving third sensor data associated with the pick event;

determining, based at least in part on the second sensor data, that the operator failed to perform the second action;

sending a third notification to a second device associated with a supervisor of the operator performing the pick event, the notification associated with the second item.

18. The one or more non-transitory computer readable media of claim 10, wherein the operations further comprise:

receiving third sensor data associated with the pick event;

determining, based at least in part on the second sensor data, that the operator failed to perform the second action;

recording an exception in an audit trail, the exception associated with the second item and the operator.

19. The system of claim 16, wherein the operations further comprise generating a pick report including a record of the return of the first item not associated with the pick event to the shelf.

20. The one or more non-transitory computer readable media of claim 10, wherein the operations further comprise sending a pick report including the status of the first item to a facility system associated with a party other than the operator.

* * * * *